US005323524A

United States Patent [19]

Stilwell

[11] Patent Number: 5,323,524

[45] Date of Patent: Jun. 28, 1994

[54] TOOL AND METHOD FOR REMOVING AN AXLE SHAFT FROM A WHEEL HUB

[75] Inventor: Ronald J. Stilwell, Stoddard, Wis.

[73] Assignee: Kiene Diesel Accessories, Inc., Addison, Ill.

[21] Appl. No.: 83,621

[22] Filed: Jun. 25, 1993

[51] Int. Cl.[5] .......................... B23P 19/00; B23P 19/04

[52] U.S. Cl. ...................................... 29/426.5; 29/254; 29/255; 29/275

[58] Field of Search ................. 29/426.1, 426.5, 426.2, 29/802, 275, 254, 255; 59/93

[56] References Cited

U.S. PATENT DOCUMENTS 1,865,420 6/1932 Kick .................................. 29/426.5
3,106,012 10/1963 Comer .................................. 29/254
4,283,827 8/1981 Abel ...................................... 29/255
4,889,372 12/1989 Dege et al. ............................ 59/93
4,965,921 10/1990 Priest ................................ 29/426.5
5,237,731 8/1993 Rutigliano ............................ 29/275

*Primary Examiner*—Mark Rosenbaum
*Assistant Examiner*—David P. Bryant
*Attorney, Agent, or Firm*—Robert J. Harter

[57] ABSTRACT

A tool for removing the axle shaft from a wheel hub includes a ram and guide assembly that makes the job quick, easy, and safe. Two threaded adaptors connect the guide brace to the wheel's lug studs. A sliding ram, guided by the brace, transmits the blow of a sledge hammer squarely against the center of the axle shaft. The solid impact releases the force that tightly binds the axle shaft to the wheel's lug studs. The ram is made of a relatively soft mild steel to prevent damage to the axle shaft.

14 Claims, 2 Drawing Sheets

TOOL AND METHOD FOR REMOVING AN AXLE SHAFT FROM A WHEEL HUB

BACKGROUND OF THE INVENTION

1. Field of the Invention

The subject invention generally pertains to the maintenance of trucks, and more specifically to a tool for removing a axle shaft from a wheel hub.

2. Description of Related Art

In many trucks, before removing a wheel assembly, its axle shaft must first be removed. Today's method of removing an axle shaft typically involves beating, prying, or pulling until the shaft releases. However, this often damages the wheel, axle shaft, or lug studs. This is because the method is awkward due to the axle shaft being axially recessed within the tire. In addition, fragments from the shaft or makeshift tools can break away and fly off to cause personal injury.

SUMMARY OF THE INVENTION

To avoid the problems of current methods of removing axle shafts it is an object of the invention to provide a quick means for releasing a axle shaft from a wheel by using a sliding ram and guide mechanism as opposed to a threaded puller type device.

Another object of the invention is to release an axle shaft *away* from a hub by first striking it *toward* the hub.

Another object is to use a mild steel ram to provide a relatively soft transition between a hub's axle shaft and a striking hammer.

Another object is to use a ram of sufficient length to compensate for the axial offset relationship between the end of a hub's axle shaft and the side wall of the wheel's tire.

These and other objects of the invention are provided by a novel axle shaft remover having a sliding ram and guide assembly that bolts to a hub's lug studs by way of two adaptors each having internal and external threads. The guide directs the ram to transmit a blow from a hammer to one end of the shaft.

DESCRIPTION OF THE PREFERRED EMBODIMENT

Figure 1:
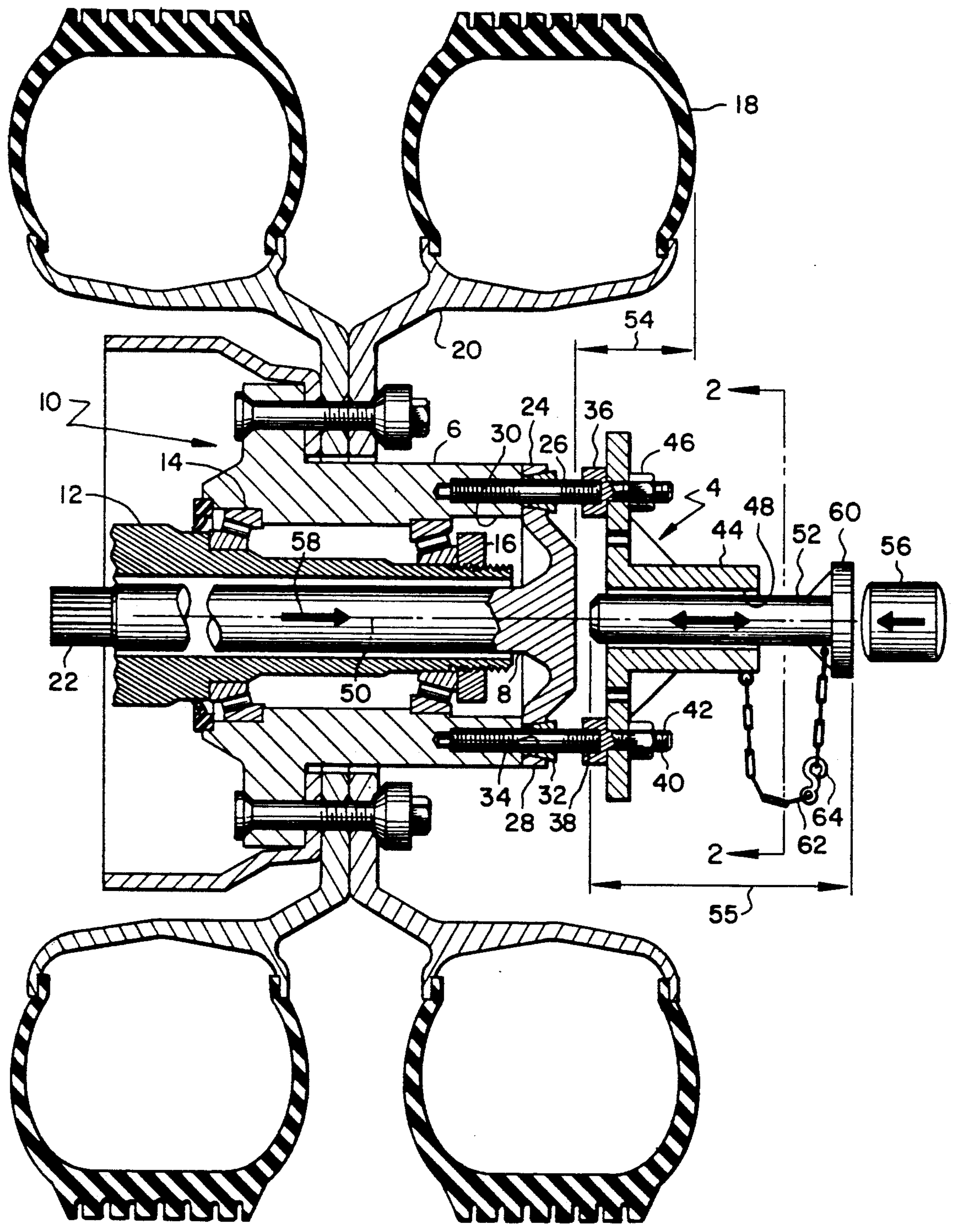
FIG. 1 shows a cross-sectional side view of the invention attached to a truck wheel.
Figure 2:
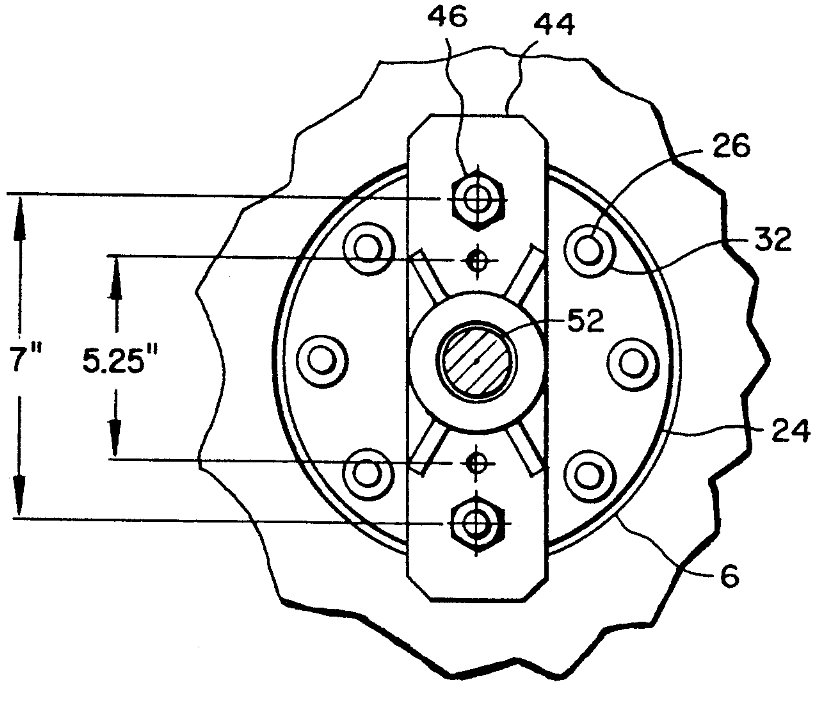
FIG. 2 shows an end view of FIG. 1.

FIGS. 1 and 2 show an axle shaft remover 4 attached to a truck hub 6 whose one-piece axle shaft 8 is in the process of being removed. A truck wheel assembly 10 includes an axle tube 12 on which wheel 6 is rotatably mounted by way of bearings 14 and axle nut 16. A tire 18 is attached to hub 6 by way of rim 20. One end 22 of axle shaft 8 is splined so that it can be driven by a drive train (not shown). The other end of shaft 8 includes an integral flange 24 that is bolted to hub 6 with typically eight lug studs 26 evenly spaced around a 7" diameter. With some wheels, there are twelve lug studs evenly spaced around a 5.25" diameter. The outside diameter 28 of flange 24 is larger than the inside diameter of hub bore 30. In many cases tapered sleeve stud locks 32 (often referred to as axle cones) are used to take up the clearance between studs 26 and the corresponding bolt holes 34 of flange 24.

In removing axle shaft 8, the lug nuts (not shown) which hold shaft 8 to wheel 6 are removed. Two adaptors 36 are fastened to two lug studs 26. Adaptors 36 include ⅝–18 (⅝" nominal O.D. and 18 threads per inch) internal threads 38 for threading onto studs 26. Adaptors 36 include a post 40 with ⅝–11 external threads 42 for fastening a brace 44 to hub 6. Nuts 46 hold brace 44 in place. Brace 44 has a generally smooth, unthreaded guide hole 48 that is approximately aligned with the longitudinal center line 50 of shaft 8. A ram 52 slidingly fits inside hole 48. In one embodiment of the invention, the length 55 of ram 52 is at least 6 inches long to extend from the flange end of shaft 8 to beyond the axial location of tire 18. The axial offset relationship of shaft 8 to tire 18 is indicated by dimension line 54.

Upon striking ram 52 with a hammer 56, much of the blow is transmitted to shaft 8. This provides a jarring effect that releases the tight bind between lug studs 26 and bolt holes 34 of flange 24. When shaft 8 pops loose, i.e., the tight bind releases, axle shaft remover 4 is taken off lug studs 26, and shaft 8 is readily pulled off by hand as indicated by arrow 58. In some cases where studs 26 are damaged or covered with rust, sealer, or new paint, a cone pliers may be needed to remove axle cones 32.

In this and other embodiments of the invention many optional modifications and enhancements have been employed. For example, ram 52 can be made of a mild steel that is softer than the flange end of shaft 8. However, other materials harder or softer than shaft 8 can also be used. Ram 52 can also include a flange 60 to provide a larger striking target. A flexible retainer 62 such as a chain, cable, or spring can keep ram 52 and guide 44 together as a unit assembly. Retainer 62 can include a coupling 64 for allowing the unit assembly to be separated when desired. Flexible retainer 62 represents any means for holding ram 52 to guide 44 and is only one example of any number of other ways for providing a means for keeping the sliding ram 52 and guide 44 assembly together, either permanently or removably. In one embodiment of the invention, the base materials of guide 44 is an aluminum alloy. This provides a lightweight guide 44. And having guide 44 made of a different material (aluminum) than ram 52 (steel) helps avoid galling. Adaptor 36 represents any one of a variety of means for positioning guide 44 in relation to shaft 8. For example, the use of a retaining clip, such as a C-washer or pin, as an equivalent substitute of nuts 46 would be well within the scope of the invention. In another embodiment of the invention, guide 44 includes a second set of holes similar to 34 only closer together for use on hubs having ½–20 lug studs at a 5.25" diameter.

Although the invention is described with respect to a preferred embodiment, modifications thereto will be apparent to those skilled in the art. Therefore, the scope of the invention is to be determined by reference to the claims which follow:

I claim:

1. A shaft remover to be used in conjunction with a hammer for removing an axle shaft from a hub, said hub having two threaded lug studs that engage a flange at one end of said axle shaft, said flange having an outside diameter greater than a bore diameter of said hub, said shaft remover comprising:

two adaptors having internal threads for screwing onto said two threaded lug studs;

a brace adapted to attach to said two adaptors, said brace having a guide hole in substantially collinear alignment with a longitudinal center line of said axle shaft when said brace is attached to said two adaptors with said two adaptors being screwed onto said two threaded lug studs; and a ram adapted to slide longitudinally within said guide hole, said ram having one end adapted to abut said one end of said axle shaft having said flange, said ram having an opposite end adapted to be struck by said hammer, whereby upon striking said ram most of the impact force delivered by said hammer is transmitted to said axle shaft to partially release a force binding said flange to said lug studs.

2. The shaft remover of claim 1, wherein said two adaptors each have external threads for holding said brace in place.

3. The shaft remover of claim 2, wherein said internal threads are ⅝-18.

4. The shaft remover of claim 1, wherein said ram consists of a material other than that of said brace to minimize galling.

5. The shaft remover of claim 1, wherein said brace consists of primarily aluminum.

6. The shaft remover of claim 1, further comprising a flexible retainer for connecting said ram to said brace.

7. The shaft remover of claim 6, wherein said flexible retainer is a chain.

8. The shaft remover of claim 6, further comprising a coupling on said flexible retainer for selectively connecting and disconnecting said ram to said brace.

9. A shaft remover to be used in conjunction with a hammer for removing an axle shaft from a hub adapted to hold a tire thereon, said hub having two threaded lug studs that engage a flange at one end of said axle shaft, said flange having an outside diameter greater than a bore diameter of said hub, said shaft remover comprising:

two adaptors each having ⅝-18 internal threads for screwing onto said plurality of threaded lug studs, said adaptors each further having external threads;

a brace adapted for fastening to said two adaptors by way of said external threads, said brace having a guide hole in substantially collinear alignment with a longitudinal center line of said axle shaft when said brace is fastened to said two adaptors and said two adaptors are screwed onto said two threaded lug studs; and a ram adapted to slide longitudinally with said guide hole, said ram having one end adapted to abut said one end of said axle shaft having said flange, and said ram having an opposite end adapted to be struck by said hammer so that upon striking said ram most of the impact force delivered by said hammer is transmitted to said axle shaft to partially release a force binding said flange to said lug studs.

10. The shaft remover of claim 9, wherein said ram consists of a material different than that of said brace to minimize galling.

11. The shaft remover of claim 9, wherein said brace consists of an aluminum alloy.

12. The shaft remover of claim 9, further comprising a chain for connecting said ram to said brace.

13. The shaft remover of claim 12, further comprising a coupling on said chain for selectively connecting and disconnecting said ram to said brace.

14. A method of removing an axle shaft from a hub, said hub having two threaded lug studs that engage a flange integrally joined to one end of said axle shaft, said flange having an outside diameter greater than a bore diameter of said hub, said method comprising the steps of:

screwing two adaptors to said two threaded lug studs, said two adaptors each having internal threads at one end and external threads at an opposite end;

fastening a brace to said two adaptors by way of said external threads, said brace having a guide hole such that, when said brace is fastened in place, said guide hole is substantially in collinear alignment with the longitudinal center line of said axle shaft;

striking a ram situated within said guide hole, said ram having one end adapted to abut said one end of said axle shaft having said flange, and said ram having an opposite end adapted to be struck;

disconnecting said brace from said two adaptors;

unscrewing said two adaptors from said two threaded studs; and axially pulling said axle shaft out from within said hub.

* * * * *